United States Patent [19]

Matsuda

[11] Patent Number: 4,597,052
[45] Date of Patent: Jun. 24, 1986

[54] DIGITAL CONTROL SYSTEM WITH ERROR MONITOR OPERATIVE UPON STARTING SYSTEM OPERATION

[75] Inventor: Toshiro Matsuda, Sagamihara, Japan

[73] Assignee: Nissan Motor Company, Limited, Yokohama, Japan

[21] Appl. No.: 610,004

[22] Filed: May 14, 1984

[30] Foreign Application Priority Data

May 17, 1983 [JP] Japan .................................. 58-84904

[51] Int. Cl.$^4$ ............................................. G06F 11/14
[52] U.S. Cl. .................................. 364/550; 364/200; 364/424
[58] Field of Search ............... 364/183, 184, 186, 424, 364/431.01, 200, 900, 550, 551

[56] References Cited

U.S. PATENT DOCUMENTS

| | | | |
|---|---|---|---|
| 3,972,230 | 8/1976 | Hanson et al. | 364/431.01 X |
| 4,267,569 | 5/1981 | Baumann et al. | 364/424 X |
| 4,287,565 | 9/1981 | Haubner et al. | 364/186 X |
| 4,306,218 | 12/1981 | Leconte et al. | 364/424 X |
| 4,338,670 | 7/1982 | Skarvada | 364/183 X |
| 4,363,092 | 12/1982 | Abo et al. | 364/200 |
| 4,376,298 | 3/1983 | Sokol et al. | 364/424 X |
| 4,399,537 | 8/1983 | Jones | 364/183 X |
| 4,480,303 | 10/1984 | Takada et al. | 364/184 X |

*Primary Examiner*—Edward J. Wise
*Attorney, Agent, or Firm*—Schwartz, Jeffery, Schwaab, Mack, Blumenthal & Evans

[57] ABSTRACT

A digital control system is provided with an error monitor system which applies dummy loads to an actuator and a monitor lamp in order to check the operation thereof. The digital control system also has a watch-dog timer responsive to a periodic signal produced as long as a microprocessor of the control system is operating normally. The control system is adapted to be initialized in response to the onset of power supply and in response to error signals from the watch-dog timer. A discriminator is provided in the control system to discriminate the cause of initialization of the control system. The discriminator enables the error monitor system when initialization due to onset of power supply is detected but not when initialization is due to errors detected by the watch-dog timer.

10 Claims, 5 Drawing Figures

DIGITAL CONTROL SYSTEM WITH ERROR MONITOR OPERATIVE UPON STARTING SYSTEM OPERATION

BACKGROUND OF THE INVENTION

The present invention relates generally to a digital control system, such as automotive engine control system, anti-skid brake control system or the like, which includes a monitor system operative upon starting system operation to check power supply, indicators and so forth. More particularly, the invention relates to an initialization-responsive monitor system for checking the operating conditions of the digital control system in response to initialization, which monitor system distinguishes whether or not initialization has taken place in response to turning ON of the system, i.e. a socalled "cold start", and performs monitor operations only in response to a cold start.

In recent years, digital processor systems for controlling various automotive vehicle components, such as engines, brake systems, air conditioner systems, height regulators and so forth have become widely available. Many such systems are provided with selfcheck functions and initial-reset functions upon starting system operations. Such functions are essential for preventing the system from malfunctioning. The control systems are further provided watch-dog timers or equivalent components which monitor for program errors in the control system. A watch-dog timer generally checks output signals periodically produced by the control systems and produces an error signal when the interval between system output signals becomes longer than a predetermined period. When an error signal is issued by the watch-dog timer, the control system is re-initialized in order to fail-safe the system. Such a fail-safe system has been disclosed in the U.S. Pat. No. 4,363,092, issued on Dec. 7, 1982 to Toshimi ABO et al and commonly assigned to the assignee of the present invention.

U.S. Pat. No. 4,363,092 discloses a malfunction preventing system for a microcomputer system, which detects an abnormal condition in the program execution to produce an alarm or reset signal to automatically restart the computer. Program run signal is detected in checking the microcomputer operation by measuring intervals of the program run signal. Since the program run signals are to be derived at predetermined time intervals when the microcomputer is running under normal condition, judgement can be made that the microcomputer is in failure when the interval of the program run signals is longer than a given period of time.

Further, the digital control system may be provided with a self-monitor system for checking actuators to be controlled, monitor indicator or display and so forth upon the system is reset and initialized. This self-monitor system generally applies damy loads to the acutators and indicator to testingly operate them, In case of the digital control systems applied to the vehicle, problem is arisen that, if initialization is taken place due to failure of program run signal in a given period of time during the vehicle running, self-monitor operation is taken place to actuate the actuators. When the digital control system is applied for engine control, the engine will be driven irrespective of driving condition to degrade drive feeling. In worst case, the engine will stall while the vehicle is running. On the other hand, when the digital control system is applied for an anti-skid brake control system, a pressure control valve in a hydraulic brake circuit may be placed at release position to disable application of brake while the damy load is applied to the actuator.

Further, by turning ON the monitor indicator or indicators, the drive must fear if the digital control system per se or acutator thereof is in deed damaged.

SUMMARY OF THE INVENTION

Therefore, it is an object of the present invention to provide an error monitor system for a digital control system, which is operative only during system cold starts.

Another and more specific object of the invention is to provide an error monitor system for a digital control system which initializes the system not only when the system is first powered up but also when errors in operation are detected, which error monitor system distinguishes between initialization due to system power-up, i.e. cold start and that due to errors in operation, i.e. warm start, and performs error monitor operations only when initialization takes place in response to a cold start.

In order to accomplish the above-mentioned and other objects, a digital control system is provided with an error monitor system which applies dummy loads to the control system to check control system components including display indicators and control acutators, and so checking the control system at the initial stage of control operation. The error monitor system is associated with a timer which outputs a HIGH-level signal for a predetermined period of time after the onset of the power supply to the digital control system. The error monitor system performs the above checking operations only in the presence of the HIGH-level signal from the timer.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are to aid explanation and understanding only.

In the drawings.

DESCRIPTION OF THE PREFERRED EMBODIMENT

Figure 1:
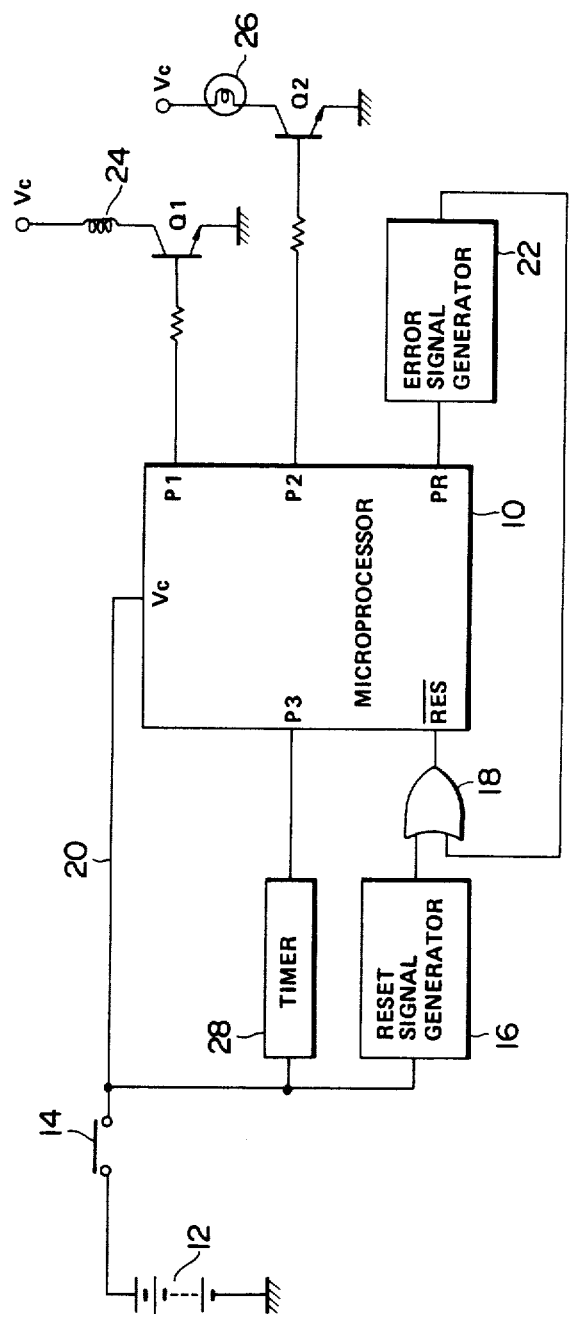
FIG. 1 is a schematic block diagram of the preferred embodiment of a digital control system including an error monitor system according to the present invention.

Referring now to the drawings, particularly to FIG. 1, a digital control system includes a microprocessor 10 which is adapted to perform automotive engine control, anti-skid automotive brake control or the like. The microprocessor 10 has a power terminal Vc connected to a vehicle battery 12 serving as a power source, via an ignition switch 14, serving as a power switch. The microprocessor 10 also has a reset terminal RES connected to a reset signal generator 16 via an OR gate 18. The reset signal generator 16 is connected to a power supply line 20 connecting the ignition switch 14 to the power terminal Vc of the microprocessor 10. The reset signal generator 16 responds to the act of closing the ignition switch 14 and therefore to the onset of power supply, to output a LOW-level reset signal to the reset terminal RES of the microprocessor 10 via the OR gate 18 for a given period of time. The microprocessor 10 is programmed to initialize the control system by setting initial values in various counters and so forth and to access the first step of a control program, in response to termination of the LOW-level reset signal after the given period of time after the onset of the power supply.

The OR gate 18 is also connected for input to an error detector 22 connected to an error monitor terminal PR of the microprocessor 10 through which a program run signal is periodically output. The error detector 22 comprises a per se well-known watch-dog timer which monitors the intervals between program run signals. The error signal generator 22 measures the intervals between occurrences of the program run signal and compares the measured interval with a reference value which is representative of an allowable maximum interval of the program run signal. The error signal generator 22 normally outputs a LOW-level reset signal to the other input terminal of the OR gate 18. The LOW-level reset signal is transmitted to the reset terminal RES of the microprocessor 10, which initializes the system when the input level at the reset terminal goes HIGH.

The microprocessor 10 also has dummy load outputting terminals $P_1$ and $P_2$. The dummy load outputting terminal $P_1$ is connected to a magnetic coil 24 of an actuator to be checked via a power transistor $Q_1$. On the other hand, the dummy load outputting terminal $P_2$ is connected to an indicator lamp 26 via a power transistor $Q_2$. The microprocessor 10 is adapted to output dummy loads from the terminals $P_1$ and $P_2$ when the control system first starts to operate and during the initial stage of control operation. By means of these dummy loads, the microprocessor 10 checks the magnetic coil and the indicator lamp.

The microprocessor, according to the preferred embodiment of the present invention, also has an input terminal $P_3$ connected to a timer 28. The timer 28 is in turn connected to the power supply line 20 to receive electric power. The timer 28 is adapted to output a HIGH-level timer signal in response to the onset of power supply to the microprocessor 10 through the power supply line 20 and holds its output signal level HIGH for a given period of time. The HIGH-pulse-width of the timer signal is selected to be longer than the period of time during which the reset signal generator 18 outputs the LOW-level reset signal. The microprocessor 10 is adapted to output the dummy load through the terminals $P_1$ and $P_2$ only when the input to the terminal $P_3$ is HIGH.

Figure 2:
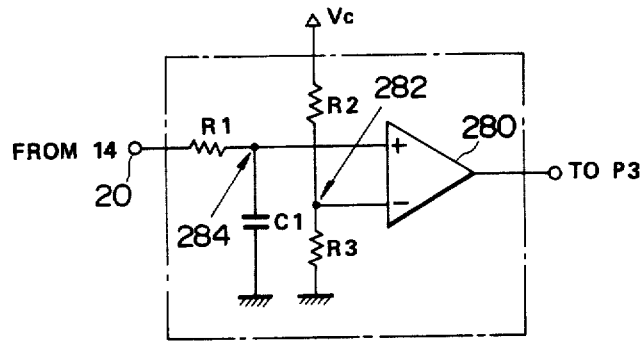
FIG. 2 is a circuit diagram of a timer in the preferred embodiment of the digital control system of FIG. 1.

FIG. 2 shows the detailed circuitry of the timer circuit 28 in the digital control system of FIG. 1. The timer 28 includes a comparator 280 comprising a differential amplifier. The positive input terminal (+) of the comparator 280 is connected to a voltage divider 282 including resistors $R_2$ and $R_3$. The voltage divider 282 is adapted to deliver a constant-voltage reference signal to the comparator. On the other hand, the negative input terminal of the comparator is connected to the power supply line 20 via a time-constant circuit 284 which comprises a resistor $R_1$ and a capacitor $C_1$. The capacitor $C_1$ is adapted to be charged at a given charge rate by the electrical power from the vehicle battery as long as the ignition switch 14 remains closed so as to define a time constant. The charge characteristics of the capacitor $C_1$ are so selected that the capacitor is charged to a voltage exceeding the reference voltage applied through the voltage divider 282 after a period of time longer than the period of time for which the LOW-level reset signal of the reset signal generator 18 is maintained.

While the charge voltage of the capacitor $C_1$ is lower than the reference voltage from the voltage divider 282, the comparator 280 outputs a HIGH-level comparator signal. After the given time constant expires, the capacitor voltage become higher than the reference voltage and so turns the comparator output LOW. Therefore, the input at the terminal $P_3$ remains HIGH for the given period of time after the onset of power supply to the control system and, then, turns LOW after expiration of the given period of time.

Figure 3:
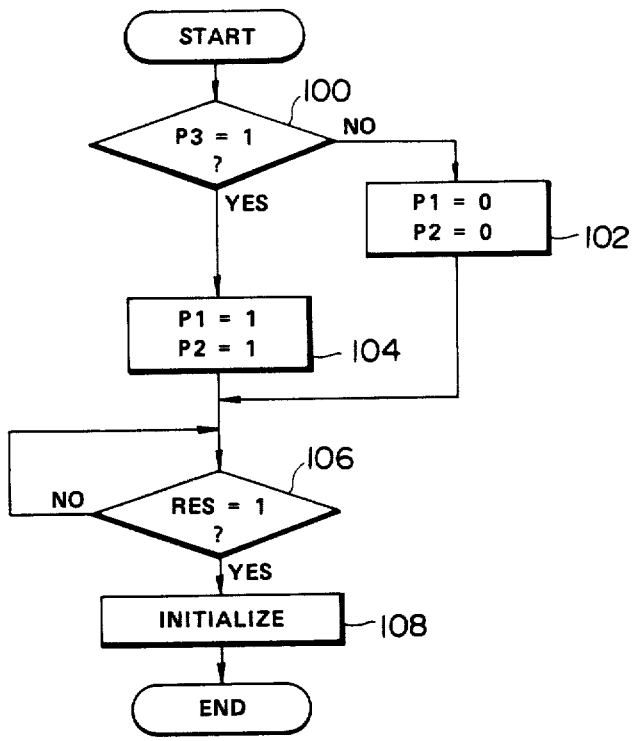
FIG. 3 is a flowchart of a system reset program to be executed by the digital control system of FIG. 1.

FIG. 3 is a flowchart of a system-checking program executed in response to LOW-level input at the reset terminal RES of the microprocessor 10. In the system-checking program, input level at the terminal $P_3$ is checked at a step 100. If the input level at the terminal $P_3$ is LOW, the outputs at the terminals $P_1$ and $P_2$ are held LOW so as not to apply a dummy load to the magnetic coil 24 of the actuator or to the indicator lamp 26, at a step 102. On the other hand, when the input level at the terminal $P_3$ is HIGH when checked at the step 100, then the output level at the terminals $P_1$ and $P_2$ goes HIGH so as to apply the dummy load to the magnetic coil to test-actuate the latter and to the indicator lamp to turn the latter ON, at a step 104.

Since the output of the timer 28 remains LOW as long as power is continuously supplied after the capacitor $C_1$ of the timer has been charged to a voltage exceeding the reference voltage, the input level at the terminal $P_3$ remains LOW. Therefore, even if the input level at the reset terminal RES drops to the LOW level due to a LOW-level error signal, the output levels at the terminal $P_1$ and $P_2$ will be held LOW so as not to perform the checking operations on the magnetic coil 24 and the indicator lamp 26.

After the steps 102 and 104, the input level at the reset terminal RES is checked repeatedly at a step 106 for as long as the input level at the reset terminal RES remains LOW. That is, the checking of the input level at the step 106 continues until the input level at RES goes HIGH. After the input level at the terminal RES goes HIGH when checked at the step 106, initialization of the system is carried out at a step 108.

Figure 4:
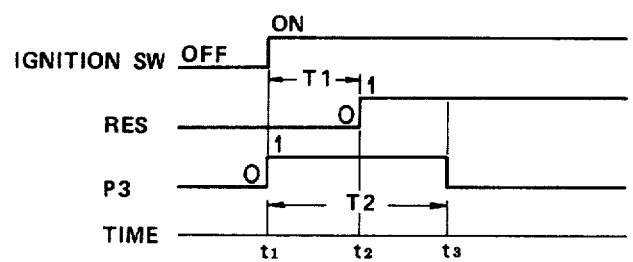
FIG. 4 is a timing chart of system resetting operation in response to onset of power supply.
Figure 5:
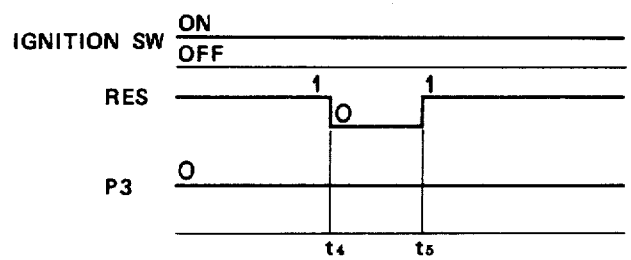
FIG. 5 is a timing chart of the system resetting operation in response to an error signal output from a watch-dog timer in the digital control system.

FIGS. 4 and 5 illustrate the timing of operation of the microprocessor as the system checking program of FIG. 3 is executed. FIG. 4 shows the operation in response to closing of the ignition switch. In this case, assuming the ignition switch is closed at a time $t_1$, the input level at the terminal $P_3$ jumps to the HIGH-level at the time $t_1$. At the same time, the reset signal generator 16 starts to output a LOW-level signal to the reset terminal RES through the OR gate 18. Assuming the duration of the LOW-level reset signal is $T_1$ and the duration of the HIGH-level timer output is $T_2$, the input level at the reset terminal RES goes HIGH at a time $t_2$ after the duration $T_1$ has elapsed. Thereafter, the timer stabilizes at the LOW level at a time $t_3$, thus dropping the input level at the terminal $P_3$ LOW.

Therefore, the system checking program of FIG. 3 starts to execute at the time $t_1$ in response to the drop in the input level at the terminal RES. At this time, since the input level at the terminal $P_3$ is HIGH, the dummy loads are applied to the magnetic coil 24 of the actuator via the terminal $P_1$ and to the indicator lamp 26 via the terminal $P_2$ in order to check the operation of the magnetic coil and the indicator lamp. Since the input level at the terminal RES goes HIGH at the time $t_2$, initialization of the system is performed at the time $t_2$.

FIG. 5 shows the operation in response to the error signal from the error signal generator 22. Assuming that the absence of program run signal has lasted longer than the reference value by a time $t_4$, the input level at the terminal RES drops LOW at the time $t_4$. Further assuming the period of the program run signal returns to its normal level and an interval shorter than the reference value is detected at a time $t_5$, the input level at the terminal RES goes HIGH at the time $t_5$. In response to return of the input level at the terminal to the HIGH-level, the system is initialized.

However, since the input level at the terminal $P_3$ remained LOW throughout this period, the dummy loads are not applied to the magnetic coil and the indicator lamp.

Therefore, according to the present invention, testing or checking of the actuator or actuators and indicator or monitor is performed only when the power supply to the microprocessor is first established. This satisfactorily prevents the control system from erroneously performing checking operation and so actuating the actuator and turning ON the indicator in response to initialization of the system due to errors in the system.

Thus, the invention fulfills all of the objects and advantages sought therefor.

What is claimed is:

1. A digital control system including a microprocessor which among other functions, checks an actuator to be controlled by the system and an operation monitor, comprising:
   first means for resetting and initializing the control system;
   second means for activating said first means in response to the onset of power supply to the control system;
   third means for detecting malfunction of said control system and activating said first means when malfunction of the control system is detected;
   fourth means, responsive to said first means being activated for applying a dummy load to said actuator and said operation monitor for testing the latter; and
   fifth means, responsive to activation of said first means by said third means for disabling said fourth means.

2. The digital control system as set forth in claim 1, wherein said fifth means is responsive to the onset of power supply to said control system for enabling said fourth means for a predetermined period of time.

3. The digital control system as set forth in claim 2, wherein said second means is active for a given period of time after the onset of power supply to the control system.

4. The digital control system as set forth in claim 3, wherein said predetermined period of time during which said fifth means enables said fourth means is longer than said given period of time for which said second means is active.

5. An error monitor system for a digital control system controlling an automotive vehicle device, comprising:
   a microprocessor performing control operations for the automotive device in accordance with a preselected control parameter, said microprocessor producing periodic signals having a period shorter than a predetermined period as long as the microprocessor is operating normally;
   a first detector for measuring the period of said periodic signal and producing a first detector signal when the measured period exceeds said predetermined period;
   a second detector for detecting power supply to said microprocessor and outputting a second detector signal for a predetermined period of time in response to the onset of power supply;
   means for resetting the control system in response to either of said first and second detector signals and initializing the control system; and
   means for applying a dummy load signal to devices to be controlled by the control system, said dummy load applying means being responsive to said second detector signal to produce said dummy signal.

6. The error monitor system as set forth in claim 5, which further comprises means responsive to the onset of power supply to said control system for enabling said dummy load applying means for a given period of time and for disabling the latter after said given period of time.

7. The error monitor system as set forth in claim 6, wherein said given period of time for which said dummy load applying means in enabled is longer than said predetermined period for which said second detector signal is output.

8. The error monitor system as set forth in claim 7, wherein said dummy load applying means is active only when said second detector signal is input while it is in an enabled state.

9. The error monitor system as set forth in claim 8, wherein said first detector comprises a watchdog timer.

10. The error monitor system as set forth in claim 9, wherein said resetting means is active in response to the trailing edge of either of said first and second detector signals.

* * * * *